April 19, 1966

C. E. KRAUS 3,246,533

MOTION TRANSMITTING DEVICE

Filed Dec. 31, 1963

INVENTOR.
CHARLES E. KRAUS
BY *Maurice W. Ryan*
ATTORNEY

INVENTOR.
CHARLES E. KRAUS
BY Maurice W. Ryan
ATTORNEY

INVENTOR.
CHARLES E. KRAUS
BY
ATTORNEY

United States Patent Office 3,246,533
Patented Apr. 19, 1966.

3,246,533
MOTION TRANSMITTING DEVICE
Charles E. Kraus, Franklin Lakes, N.J., assignor to Excelermatic, Inc., a corporation of New York
Filed Dec. 31, 1963, Ser. No. 334,834
6 Claims. (Cl. 74—200)

This invention relates to motion transmitting devices, and more particularly to speed changing power transmission devices. The invention described and claimed herein is particularly useful in devices of the type disclosed and claimed in my copending application Serial No. 132,-985, filed August 1, 1961, relating to spool type traction drives.

In order to enable adjustment of the speed ratio of spool type traction drives such as shown therein, some form of control means is necessary. Simple control levers and suitable gearing or cylinder assistance are adequate and practical for devices which are normally subjected to relatively light loads. If loads beyond certain limits are applied, excessive effort may be required to move the control to adjust the ratio and surface damage to traction contacts is possible.

A control system employing a spool carrier mounted in eccentric cradles was also disclosed in my earlier application Serial No. 132,985. With this system, rotation of the eccentrics causes the spool axis to tilt to a position causing precession and ratio change. This system is practical if some form of external sensing means or control feed back is used to return the eccentrics to a non-precessing position when the desired ratio is obtained. With this arrangement, it is possible to encounter hunting under some conditions.

The basic device comprises driving and driven discs with a spool-like structure disposed between them to transmit motion. In another invention I have shown that a spool-like member for transmitting motion between the discs may comprise a pair of axially aligned members which transmit torque from one to the other through cam rollers disposed between the adjacent ends, the latter being shaped to provide cam surfaces. The tangential force originating at the traction contact as the result of either input or output torque generates a proportional tangential force on the cam radius and cam action develops a relatively heavy axial force. This force has components normal to the tangent at the traction point and radial to the spool axis. A twisting couple results which tends to load the bearings within which the spool members rotate in such a way as to cause axial movement thereof and, on occasion, to jam a roller and stall the drive. If the axial force built up as a function of cam action is restricted by bearing friction forces between the spool members and the surrounding bearings which tend to resist the desired axial movement or by any tendency to move both input and output rollers axially toward the input disc, the outlet disc may unload and allow slip. Hence, it is essential that the assembly be designed so that the tangential forces can be handled without adversely affecting operation of the device.

In the present newer and greatly improved embodiment of apparatus according to my invention, the axially aligned members with camming surfaces disposed between them are replaced with a unitary spool-like member with respective ends shaped to effect traction contact with the driving and driven discs. This unitary spool piece is carried in a sleeve member in rotatable orientation between the driving and driven discs and the sleeve member is arranged in a tiltable spool carrier. Camming surfaces are provided on the peripheral outer surface of the sleeve in which the motion-transmitting piece rotates and a second set of camming surfaces are provided on a moveable control member arranged operably in the carrier itself. In this embodiment, precessing motion is imparted to the spool member by rotating the control member in the carrier body, thereby urging cams disposed between the camming surfaces to a new cam ramp position corresponding to a desired new transmission ratio. In this improved embodiment, then, it may be seen that the cams and camming surfaces involved in the apparatus are not in continuous motion as in the two-piece spool embodiments. This design obviates cam wear and is particularly advantageous for continuous heavy duty applications.

It is an object of this invention to provide an improved speed changer or power transmission.

It is a second object of this invention to provide improved means for obtaining precessing tilt in power transmission devices.

It is a third object to provide a torque-responsive control in power transmissions whereby an increase in load effects a reduction of ratio at a predetermined rate by inherent design characteristics or through adjustable means.

It is a further object to provide, in a speed transmission, control means which can be locked in a fixed, preselected ratio for close speed regulation.

It is a still further object to provide, in devices of the type illustrated herein, means whereby the amount of tilt or movement of the spool axis, which causes the drive to precess to another ratio, is a direct function of the difference between the actual ratio and the desired or set ratio.

It is yet another object of this invention to provide in a device of the type described herein improved antifriction means for both axial and rotational movement of the traction rollers.

Another object is to provide antifriction means which insures that the traction rollers used rotate on a linear axis.

Another object is to provide antifriction means of increased life in devices of the type described.

Still another object is to provide, in devices of the type described, an antifriction means which is simple and inexpensive to manufacture.

Further objects are to provide a power transmission control which is simple, rugged and inexpensive to manufacture, and which is easily adapted to a variety of remote electrical, hydraulic, or other controls used for automatic or feed back control in process or specialized applications.

My invention, together with other objects and advantages, will be best understood from the accompanying drawings and description wherein:

FIGURES 1–2a illustrate an embodiment of apparatus according to my new invention wherein the two spool members described in connection with the first-mentioned embodiments are replaced by a unitary spool piece and wherein the camming elements are not continuously in motion.

Figure 1:
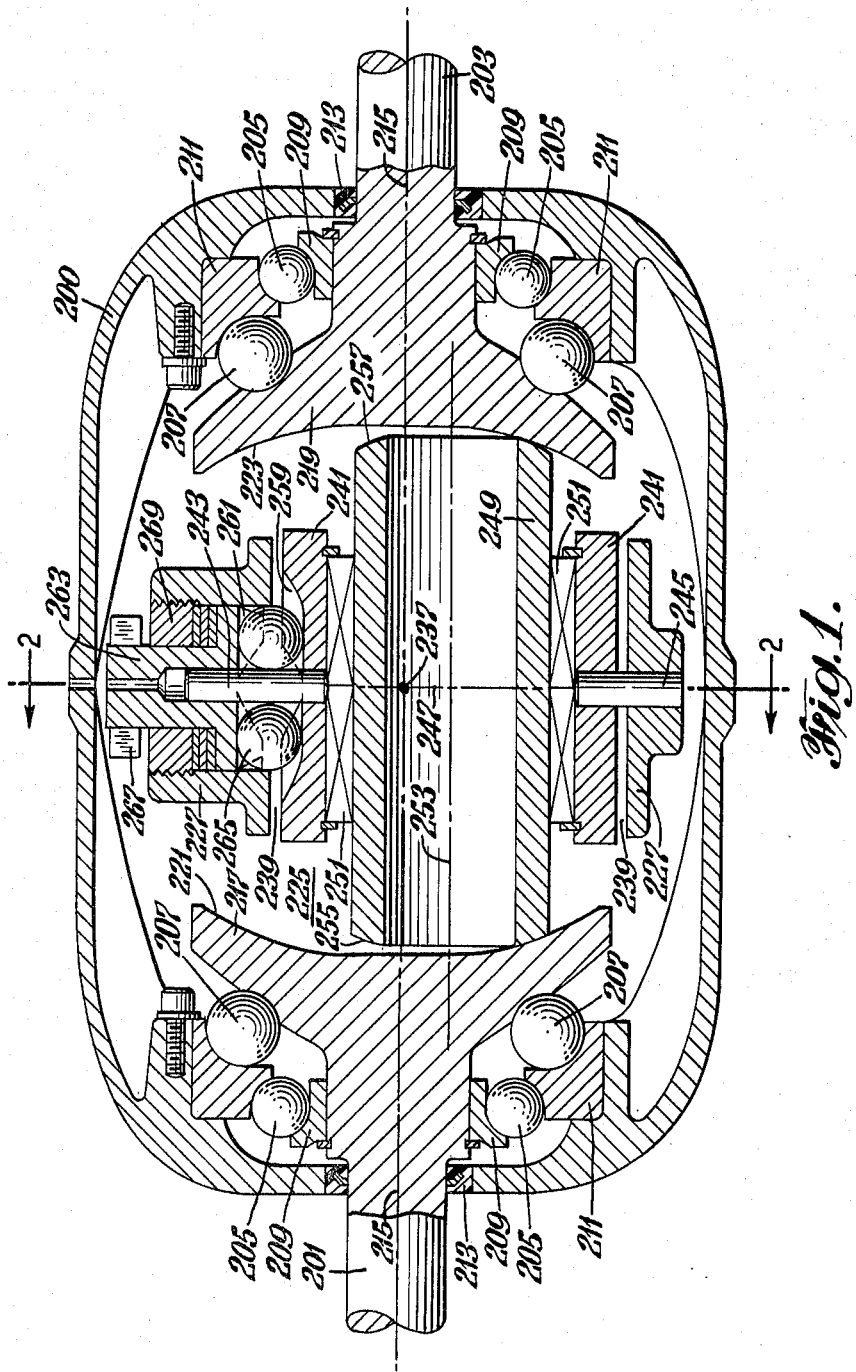
FIGURE 1 is a longitudinal sectional view of an improved speed changing device according to the present invention.

FIGURE 1 shows a sectional view of such a drive comprising a housing 200 designed to accommodate an input or driving shaft 201 and an output or driven shaft 203. The shafts 201, 203 and related discs are supported for axial alignment and for thrust loading by suitable arrangements of bearings 205, 207 in bearing racks or cages 209, 211 and are sealed at their respective entry points into housing 200 by seals 213. Shafts 201 and 203 are aligned on the drive main axis 215. The respective inner ends of the shafts 201, 203 carry concave driving and driven discs 217, 219, shaped so that their respective appositely disposed concave surfaces 221, 223 define a substantially spherical cavity 225 concentrically aligned with the drive axis 215.

A spool carrier 227 is pivotally mounted in spherical cavity 225 by pivotal extensions (shown in FIGS. 2, 2a) 229, 231 journaled to the housing 200 by bearings 233, 235. The spool carrier 227 is thus disposed for rotation about axis 237 which is at substantially right angles with the drive axis 215 and may be coplanar therewith. An eccentrically located generally cylindrical opening 239 extends longitudinally with respect to the drive axis 215 through spool carrier 227. A sleeve 241 is arranged in opening 239, supported pivotally but lockably restrained therein against rotation about the drive axis by pins 243 and 245. Thus, a third axis of movement 247, is provided extending through the sleeve pivot pins 243, 245 and sleeve 241 may be caused to precess the drive by rotating it laterally about this axis 247. Axis 247 is at substantially right angles to both the drive axis 215 and the spool carrier pivot axis 237 and all three of these axes may intersect at a common point but not essentially.

A generally cylindrical rotatable member or spool 249 is arranged concentrically in the sleeve 241 and held in space friction-free rotational relationship therewith by means of roller bearings 251. Since spool 249, as a unitary piece, does not undergo any axial movement such as in the two-piece spool embodiments, roller bearings 251 may be used instead of ball bearings. Added bearing life attending roller bearings thus accrues to the users of of this embodiment of my invention. The spool axis 253 is one of concentricity with the spool carrier opening 239. Axis 253 intersects the sleeve pivot axis 247 but is displaced from the common plane in which lie the drive axis 215 and the spool carrier pivot axis 237. The respective ends of spool 249 are faced as at 255 and 257 to provide for tractional contact with the driving disc and driven disc surfaces 221, 223.

A portion of the peripheral surface of sleeve 241 is provided with camming surfaces 259. A second set of camming surfaces 261 is also provided on a control cam 263 which is arranged rotatably on sleeve pivot axis 247 in the spool carrier 227. The upper sleeve pivot pin 243 is also carried by the control cam 263 as shown in the drawings. Cam rollers, which may be in the form of balls 265, are disposed between the camming surfaces 261 on the control cam and 259 on the sleeve 241. Control cam 263 is secured with all its related parts by cam holding plug 269 which threadedly engages spool carrier 227. Rotational movement of the control cam 263 in the spool carrier 227 forces the balls 265 against ramp portions of camming surfaces 259 on the sleeve 241, imparting precession movement to the sleeve and spool 249 about the sleeve pivot axis 247. In immediate response to such a precessing movement or tendency theretowards, the spool carrier assembly pivots on bearings 233, 235 to a new orientation corresponding to a preselected transmission ratio. The entire cam assembly remains stationary except for actual control changes which are made intentionally and the net effect of the arrangement is similar to that produced by a jaw clutch.

Rotational control movement of the cam 263 is effected by a control arm 267 connected to the cam in any conventional manner such as by wrench flats or the like. Arm 267 may extend to any convenient control point from which control stimula may be applied thereto from means external of the drive.

Figure 2:
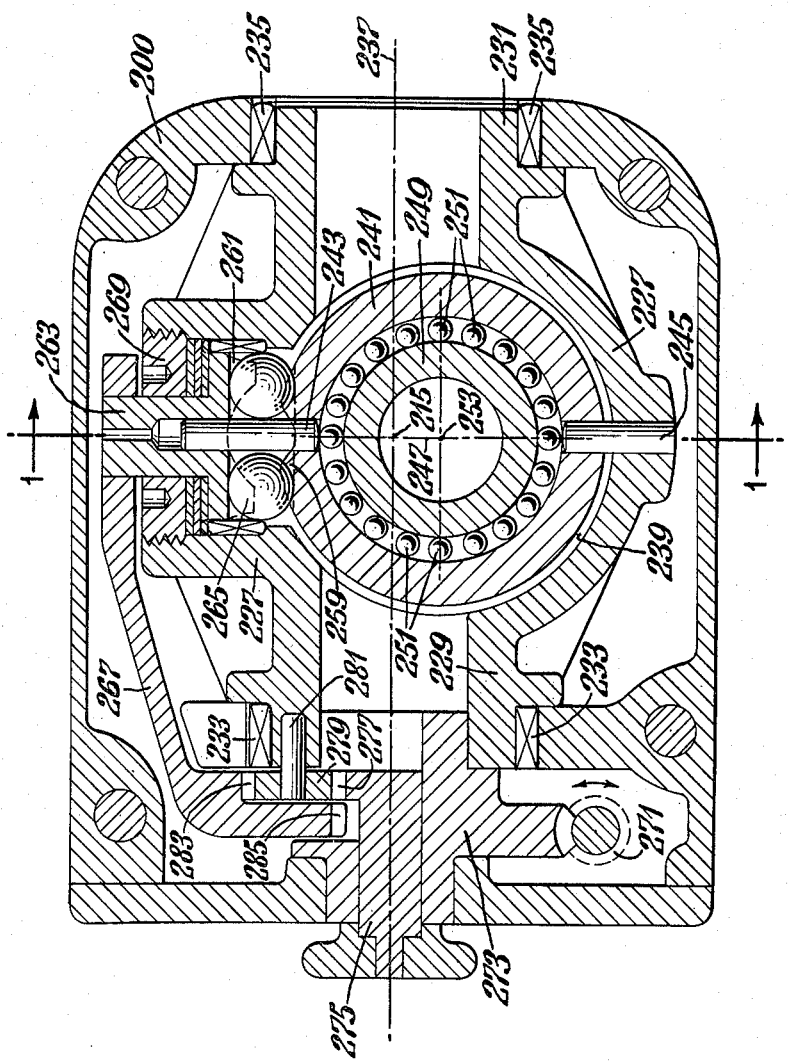
FIGURE 2 is a cross-sectional view of the embodiment illustrated in FIGURE 1, taken at lines 2—2 of that figure.

In FIGURE 2, the left portion of the drawing shows a control arrangement suitable for two-direction industrial drives adapted for adjustment through turning a control knob or crank or the like. The actual hand device, not shown, would mount at the end of a worm 271 arranged to engage a segmental worm gear 273 rotatably mounted on the spool carrier axis 237. The worm gear segment is provided with a slideably movable post 275 with a projecting tooth 277. In the position shown in FIGURE 2, the drive control movement is imparted to the control arm 267 through the worm 271, worm gear segment 273, post 275, tooth 277, a pivoted gear-like member 279 arranged to rotate on a pin 281, to a saw-tooth surface 283 on the control arm. In an alternative position, should the drive be driven in reverse, post 275 is pulled outwardly or to the left of the position shown in FIGURE 2, so that tooth 277 engages a second saw-toothed engagement point 285 on arm 267. Post 275 and its tooth 277 will rotate on axis 237 with the gear segment 273 because these parts are pinned for unitary movement. Any conventional means may be used in conjunction with the post 273 to lock it in one position or the other and to indicate the drive's direction for the respective positions. Similarly, any suitable speed ratio indicia may be provided for the worm 271 position, adjacent whatever actuating means is employed.

Considered at any preselected ratio for the drive, the control cam 263 is held stationary by arm 267. Tangential drive forces at the spool contact faces 255, 257 imparted from and to the driving and driven disc surfaces 221, 223 are equal and opposite at each end of the roller, producing a force couple which tends to pivot sleeve 241 about axis 247 and make the cam balls 265 roll up cam ramps of the camming surfaces 259, 261. A reaction force is thus developed against the sleeve 241 tending to hold it in its set position. Arm 267 thus senses the force couple for any setting just as the control posts in my other embodiments. Similarly, if the arm 267 is moved to rotate the cam 263 to a new ratio position, the immediate corresponding pivotal movement of the spool carrier 227 and entire assembly along with it serves to reposition the control arm to its original stable position but in a torque circuit corresponding to the newly selected ratio.

Figure 2A:
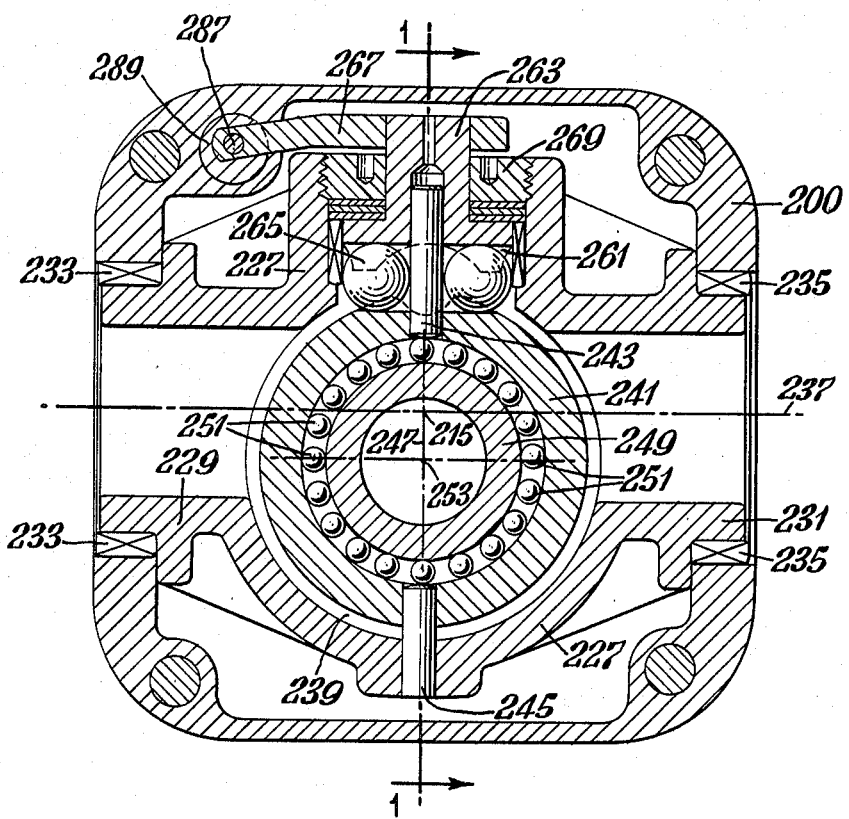
FIGURE 2a is a cross-section similar to that of FIGURE 2 but showing the arrangement for a hydraulic or a pneumatic precessing control actuator.

FIGURE 2a shows a modification suitable for unidirectional drives where it may be advantageous to use hydraulic or pneumatic control actuators. In such an arrangement a shortened control arm 267 is connected to a protruding piston rod 287 of pneumatic or hydraulic cylinder 289 which is supplied with a suitably controlled fluid pressure medium. If a speed increase is desired the pressure in cylinder 289 is increased, imparting movement to rod 287, arm 267 and cam 263, thereby pivotally steering sleeve 241 and the spool 249 to a higher disc engagement ratio. Carrier 227 simultaneously pivots to a new position on axis 237, thereby returning arm 267 to its original stable position, but now balanced by the higher pressure in cylinder 289.

The foregoing description, though given in great particularity and with detailed explanations of several embodiments of apparatus according to my invention, is intended to be illustrative and should not be construed in a limiting sense, it being intended to define the scope of my invention according to the appended claims.

What is claimed is:

1. In a motion transmitting device having a generally concave driving disc and a generally concave driven disc arranged in a housing means to define a generally spherical cavity between appositely disposed concave facia portions of said driving and said driven discs, the improvement comprising, in combination, a generally cylindrical rotatable member having respective end surfaces in engagement with the respective facia portions of said discs; sleeve means for carrying said rotatable member in rotatably operable position; anti-friction means disposed between said rotatable member and said sleeve means; carrier means pivotally supporting said sleeve means in a plane transverse to the cylindrical axis of said rotatable member; means pivotally supporting said carrier means in the housing means and having an axis generally at right angles to the sleeve pivot axis; rotatable control means in said carrier means arranged to rotate in a plane extending parallel to the cylindrical axis of said rotatable member; camming means disposed between a first camming surface on said control means and a second camming surface on an exterior wall of said sleeve means; control linkage means operably connected to said control means and arranged to impart rotational motion thereto with respect to said control means' disposition in said carrier means whereby precessing motion is imparted to said rotatable member through said control means, camming surfaces, camming means and sleeve means.

2. Apparatus in accordance with claim 1 wherein said control linkage means is hydraulically actuated.

3. Apparatus in accordance with claim 1 wherein said anti-friction means between said rotatable member and said sleeve means consist of roller bearing means having roller longitudinal axes extending parallel to the cylindrical axes of said rotatable member.

4. In a motion transmitting device having a generally concave driving disc and a generally concave driven disc arranged in a housing means to define a generally spherical cavity between appositely disposed concave facia portions of said driving and said driven discs, the improvement comprising, in combination, a cylindrical rotatable member having respective end surfaces in engagement with the respective facia portions of said discs; sleeve means for carrying said rotatable member in rotatably operable position on its cylindrical axis; anti-friction means disposed between said rotatable member and said sleeve means; carrier means pivotally supporting said sleeve means in a plane transverse to the cylindrical axis of said rotatable member; a journal pair pivotally supporting said carrier means in the housing means and having a common axis generally at right angles to the sleeve pivot axis; rotatable control means in said carrier means arranged to rotate in a plane extending generally parallel to the cylindrical axis of said rotatable member and the journal pair axis and generally normal to the sleeve pivot axis between a first camming surface on said control means and a second camming surface on an exterior wall of said sleeve means; control linkage means operably connected to said control means and arranged to impart rotational motion thereto with respect to said control means' disposition in said carrier means whereby precessing motion is imparted to said rotatable member through said control means, first camming surface, camming means, second camming surface and sleeve means.

5. Apparatus in accordance with claim 4 wherein said control linkage means is hydraulically actuated.

6. Apparatus in accordance with claim 4 wherein said anti-friction means between said rotatable member and said sleeve means consist of roller bearing means having roller longitudinal axes extending parallel to the cylindrical axes of said rotatable member.

No references cited.

DAVID J. WILLIAMOWSKY, *Primary Examiner.*

DON A. WAITE, *Examiner.*

L. H. GERIN, *Assistant Examiner.*